3,249,590
ANIONIC POLYMERIZATION OF LACTAMS WITH PYRIMIDINES OR PYRAZINES AS ACTIVATORS
Edward W. Pietrusza, Morris Township, Morris County, and Rudolph Pinter, Morristown, N.J., assignors to Allied Chemical Corporation, New York, N.Y., a corporation of New York
No Drawing. Filed Apr. 20, 1962, Ser. No. 188,960
10 Claims. (Cl. 260—78)

This invention relates to the preparation of solid, linear polyamides of high molecular weight. More particularly, this invention relates to solid polymers of ε-caprolactam of high molecular weight and to a process for the production of said polymers.

Many processes have been proposed in the past for the preparation of solid polymers of lactams containing more than 5 carbon atoms in the lactam ring. These processes have been based either upon the hydrolytic polymerization of said lactams in the presence of various acidic and basic catalysts, or upon the anionic polymerization of these lactams under anhydrous conditions in the presence of an alkali or alkaline earth metal compound as the sole catalytic agent.

A disadvantage of these prior art processes is the necessity of conducting said processes at relatively high temperatures; e.g., for caprolactam, temperatures in excess of the polymer softening point of about 215–225° C. are necessary in order to obtain a satisfacory rate and degree of polymerization. An undesirable feature in the use of such temperatures is that the degree of polymerization tends to decrease as the temperature of the reaction mixture is increased. It is well known that the polymerizability of ε-caprolactam is influenced by a chemical equilibrium between the lactam and the polymer produced therefrom. At temperatures in excess of about 215° C., the presence of appreciable quantities such as about 10% of ε-caprolactam is permitted by the equilibrium, whereas below said temperatures the formation of poly-ε-caprolactam is more highly favored.

Consequently, in order to obtain a polyamide possessing acceptable physical properties by the above processes, it is frequently necessary to resort to extensive purification operations in order to remove the undesirable monomeric units present therein.

Furthermore, the molecular weight of the polyamide produced by these prior art processes is relatively low, i.e. the polymeric products exhibited a maximum reduced viscosity in 0.5% m-cresol of about 3.5, which is equivalent to a polyamide possessing a molecular weight of the order of 100,000.

In addition, in those instances wherein it was desirable to transform poly-ε-caprolactam into molded shapes, it was usual to heat said lactam to a temperature in excess of its melting point to prepare the desired fabricated shapes by extrusion or injection techniques. The poly-ε-caprolactam melt, however, is extremely viscous, transfers heat slowly, and shrinks on cooling; consequently such melt is unsuitable for the preparation of large shaped articles. Moreover the above cited polyamides possess a tendency to discolor in air at the elevated temperatures, about 270° C., commonly employed in said molding operations. Such discoloration or darkening has been attributed to oxidative attack upon the primary amino end groups found in these polyamides.

It has been disclosed in our co-pending U.S. application, Serial No. 146,449, filed October 20, 1961, that the inherent disadvantages of the above described prior art processes are overcome by polymerizing lactams under anionic polymerization conditions, i.e. under base-catalyzed anhydrous conditions wherein a lactam salt of an alkali metal or alkaline earth metal is used as a catalyst, and with employment of specifically an N-(sym. triazino) lactam as cocatalyst. Anionic polymerization conditions are also disclosed in published art e.g. U.S. Patent 2,739,959 of March 27, 1956, to Ney and Crowther and U.S. Patent 3,017,391 of Jan. 16, 1962, to Mottus, Hedrick and Butler.

We have now discovered that promotion of the anionic polymerization of a lactam results upon providing at least one N-pyrimidino or N-pyrazino lactam, including fused ring pyrimidino and pyrazino lactams such as N-quinazolino lactams, in the polymerization reaction mixture. Said pyrimidino- and pyrazino-substituted lactam can be prepared by heating the metal salt of the lactam and a pyrimidine (i.e. a 1,3-diazine) which bears on at least one of the carbon atoms of the pyrimidine ring, at a 2, 4 or 6 position, a substituent attached to said carbon atom by a more electronegative atom than the nitrogen atom of the lactam; or a pyrazine (i.e. a 1,4-diazine) with like substituent. By metathesis, the metal cation from the lactam salt combines with said substituent, and the lactam residue replaces said substituent. Substituents replaceable by this metathesis include halogen atoms and substituents attached to a carbon atom of the pyrimidine or pyrazine ring by an oxygen atom. Illustrative of such replaceable substituents are: chloro, hydroxy, alkoxy, aryloxy, arylalkoxy, cycloalkoxy, mono- and dialkylamino, mono- and diarylamino, mono- and diarylalkylamino, and mono- and dicycloalkylamino.

Illustrative evamples of pyrimidines suitable as starting materials for reaction with lactam salts to form the promoters of our invention are:

2,4,6-trichloropyrimidine
2,4,6-trihydroxypyrimidine (barbituric acid)
2,4-dichloropyrimidine
2,4-dibromopyrimidine
2-iodo-6-chloropyrimidine
2-chloro-6-fluoropyrimidine
2,4-dihydroxy-6-methyl pyrimidine
2,4-dihydroxypyrimidine
2-chloro-6-hexoxypyrimidine
2,4,6-trimethoxypyrimidine
2,4,6-triphenoxypyrimidine
5-cyclohexl-6-bromopyrimidine
2-benzyl-6-chloropyrimidine
4-cyclohexy-6-bromopyrimidine
2,4-di(methylamino)pyrimidine
2-chloro-6-diisopropylaminopyrimidine
2-bromopyrimidine
2,4-dihexoxypyrimidine
2,4-dibenzyloxypyrimidine
2,4-dibenzylaminopyrimidine
2-chloro-4-butyl-6-methoxypyrimidine
2-chloro-4-methyl-6-decyloxypyrimidine
2-chloro-4,5-dibutylpyrimidine
4,5-diphenyl-6-chloropyrimidine (1) 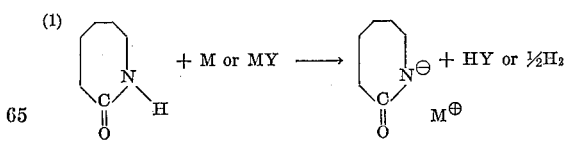

wherein M is an alkali metal such as lithium, sodium, potassium, rubidium, cesium; or alloy thereof; or alkaline earth metal such as calcium and including magnesium; and Y is an anionic species such as hydride, hydroxide, carbonate, amide, oxide, salt of a carboxylic acid, and those carbanions derived from such hydrocarbon species as alkanes, cycloalkanes, arylalkanes and the benzenoids. Illustrative examples of the last-named species of anions are

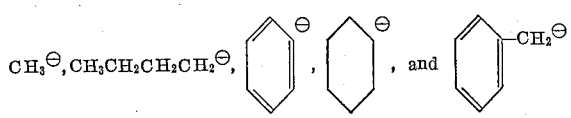

Suitably the salt-forming metal or compound is admixed under anhydrous conditions with the lactam to form a reaction mixture comprising from about 0.001 to about 0.1, preferably from about 0.003 to about 0.02 equivalents of said metal per molecular proportion of lactam. The temperature of the mixture is brought to a level at which interaction is complete between salt-forming metal or compound and the lactam. Suitable temperatures using, for example, ε-caprolactam are in the range from about 90° C. to about 130° C.

The addition of one of the above listed pyrimidines, for example, to the lactam-lactam salt reaction mixture produced by the process illustrated in Equation 1 results in rapid polymerization of the lactam to form a lactam polymer incorporating said pyrimidine. Although we do not wish to be bound by any particular theory, we believe that the addition of the pyrimidine to the reaction mixture results in the rapid interaction of said pyrimidine with lactam salt in the reaction mixture to form, in situ, N-pyrimidino-lactam, as illustrated for an epsilon-caprolactam salt by Equation 2:

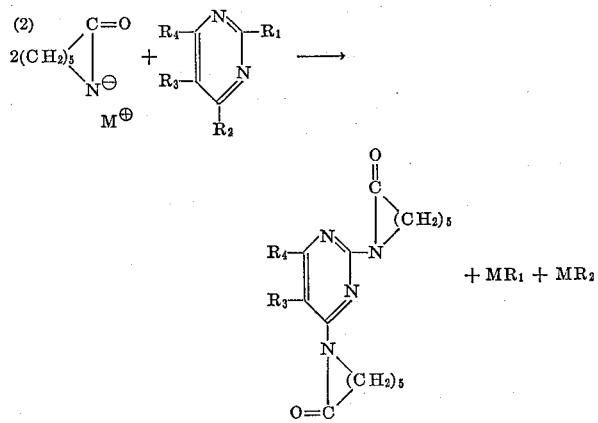

wherein M is a metal and at least one of the R's is a replaceable substituent as above defined. When more than one of the R's is a replaceable substituent, two or more of these R's (but not an R at the 5-position in the pyrimidine ring) will in general be replaced on reaction with e.g. caprolactam lithium salt e.g. as in illustrative Equation 2. When $R_4$ as well as $R_1$ and $R_2$ is replaceable, a 2,4,6-tri-(ε-caproamido)pyrimidine is formed of formula:

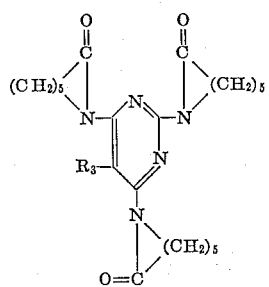

In these formulas all substituents which are not replaced by lactam preferably are free of reactive hydrogen, so as to be inert toward the metal salt of the lactam.

2-hydroxypyrimidine
2,4-diethoxypyrimidine
2,4-dimethoxypyrimidine

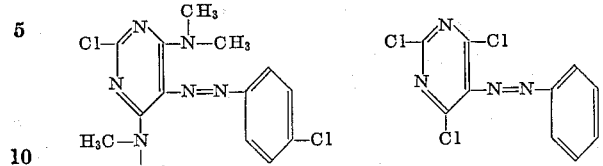

4-chloroquinazoline
4-methoxyquinazoline
2,4-dichloroquinazoline

Illustrative pyrazines are 2-chloro- and 2-bromopyrazines; tetrachloropyrazine; and pyrazines derived from these by replacing one or more halogen atoms by methoxy or phenoxy groups.

The N-pyrimidino and N-pyrazino lactam promoters used in our process are conveniently prepared by heating, in the lactam as diluent, a metal salt of the lactam and a pyrimidine or pyrazine which bears on at least one carbon atom of the pyrimidine or pyrazine ring a substituent replaceable by metathesis with said lactam salt. Our promoters can also be prepared from lactam salts by heating in a diluent such as benzene, etc. from which the promoter can be isolated if desired.

The metal salt of the lactam will ordinarily be prepared by heating a known catalyst of anionic polymerization of lactam, i.e. alkali or alkaline earth metal or saltforming compound thereof, with excess lactam. Such reaction with ε-caprolactam is illustrated by Equation 1:

The overall process occurring in our polymerization is illustrated by Equation 3 for caprolactam and a mono-ε-caproamidopyrimidine as promoter:

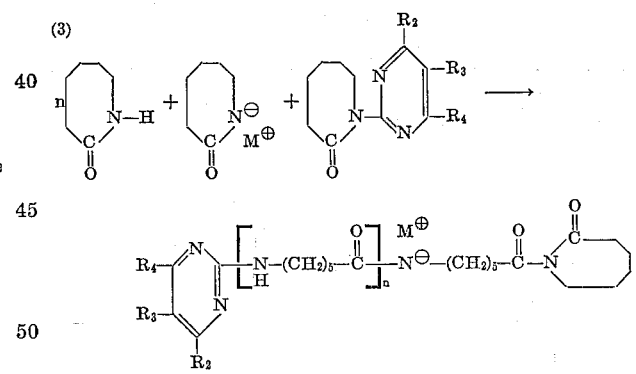

wherein $n$ is an integer from $1 \times 10^3$ to $1 \times 10^4$. The process can be pictured as continuing upon transfer of the metal cation $M^+$ to monomer, forming the metal salt of the lactam from a fresh monomer molecule, with the amido hydrogen from the monomer replacing the metal cation in the polymer.

In those instances wherein the pyrimidine employed contains readily replaceable substituents in the 2,4 or 2,4,6 positions, polyamides of the following formulas having pyrimidino end groups are obtained:

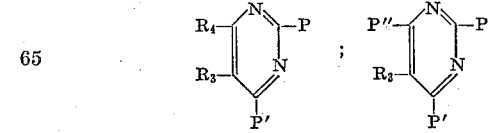

wherein P, P' and P'' are polycaproamide chains like that in the product of Equation 3.

Inasmuch as an N-pyrimidino- or pyrazinolactam must interact with a metal salt of the lactam to initiate our polymerization process, it is convenient to avoid complete consumption of the available metal salt of lactam for the formation of an N-pyrimidino- or pyrazinolactam. Accordingly the ratio of equivalents of metal forming the lactam salt to equivalents of replaceable substituents in the quantity of pyrimidine or pyrazine supplied is at least about 1.1:1, preferably 2:1–10:1, and suitably up to about 20:1 or higher. At much lower ratios than 2:1 the reaction may be quite slow, and may become uncertain because of impurities reacting with and decomposing the metal salt of the lactam.

The metal usually employed is an alkali metal and the pyrimidine compounds most commonly available have two (or three) readily replaceable substituents such as chloro, methoxy or phenoxy. In such instances preferred ratios of atomic proportions of alkali metal:molecular proportions of pyrimidine compound supplied in accordance with the foregoing are from about 4:1 (or 6:1) to about 20:1 (or 30:1).

The proportion of the dichloro or trichloro or like pyrimidine used, based on lactam, affects the solubility of the polymer product. Relatively large proportions result in a final product at least partially insoluble in meta-cresol.

The detailed description of our process and the example which follows set forth the employment of lithium hydride and ε-caprolactam in our process; but it is to be understood that these specific compounds and the conditions cited for use therewith are illustrative rather than limiting; and that the same principles and general procedure apply when using other metals or other metal compounds as above defined, and when using other lactams including in particular, 2-pyrrolidone, 2-piperidone, enanthic lactam, omega-caprylic lactam, and their homologs; and using if desired dilactams such as methylene-bis-caprolactam or isopropylidene-bis-caprolactam for introducing cross-linking. Of course it will be found that optimum conditions differ as these substitutions are made.

Polymerization temperatures which can be used in our process range from the melting point of the lactam monomer to the decomposition temperature of the resulting polymer. Temperatures particularly suitable for polymerization of ε-caprolactam range from about 140° C. to about 215° C. It has been found convenient to polymerize caprolactam by our process at temperatures below about 200° C., preferably within the range from about 160° C. to about 180° C.

It is necessary that the polymerization process as disclosed herein be conducted under substantially anhydrous, non-acidic conditions. Those compounds which are capable of functioning as proton donors, viz. acids stronger than the lactam acting as an acid, are to be excluded from the reaction mixture (or neutralized), inasmuch as acidic compounds decompose equivalent proportions of the metal salts of lactams in the reaction mixture by replacing the metallic cation moiety of said species with a proton. Furthermore under the process conditions disclosed herein the presence of a proton donating species such as water may function to hydrolyze either the N-pyrimidino- (or pyrazino-) ε-caprolactam or ε-caprolactam to their corresponding omega amino acids. The quantity of water and/or proton donating species should be kept preferably not above about 50 p.p.m.

The polymerization process is preferably conducted by adding a pyrimidine to a reaction mixture containing metal salt of caprolactam and ε-caprolactam; but a reverse procedure can be utilized if desired, i.e. a pyrimidine can be added to the caprolactam, and the alkali or alkaline earth metal or salt-forming compound thereof can be added thereafter. Alternatively, if desired, it is possible to add the pyrimidine simultaneously with the alkali or alkaline earth metal anionic catalyst to the ε-caprolactam.

The metal salt of ε-caprolactam is preferably prepared in situ immediately prior to its utilization in the polymerization process, to minimize risk of contaminiation. However a mixture of said metal salt of caprolactam and ε-caprolactam is stable at temperatures of 20–25° C. for a period of at least one month; and even at higher temperatures, e.g. 90° C., the time of stability is about 4 days. Accordingly the salt can be prepared and stored if desired.

Pyrimidines suitable for use in our process are readily available. For instance barbituric acid (2,4,6-trihydroxypyrimidine) is available; and this can be converted to 2,4,6-trichloropyrimidine by heating with phosphorus oxychloride, suitably in presence of dimethylaniline (King et al., Journal of the Chemical Society (London) for 1947, page 1247). Similarly 2,4-dihydroxypyrimidine can be prepared by the interaction of urea and fuming sulfuric acid in the cold; and can be heated at 140° C. in the presence of phosphorus oxychloride to produce 2,4-dichloropyrimidine in a yield of 80% of theoretical. (Berichte, Vol. 38 of 1905, page 1689). These chlorides can be converted to alkoxy, phenoxy, etc. pyrimidine by heating with the sodium salt of the appropriate alcohol or phenol.

By utilization of a pyrimidine in conjunction with an alkali or alkaline earth metal catalyst in accordance with our invention, one is able to obtain an extremely high rate of polymerization of ε-caprolactam as well as a high degree of conversion to polymer at temperatures considerably below the melting point of poly-ε-caprolactam, i.e. at temperatures well below 215° C. At such temperatures the equilibrium is highly favorable toward polycaproamide versus caprolactam monomer. Hence one is able by our process to obtain polymeric products in which at least 95% of the monomer has been converted to polymer. Such degree of monomer conversion is highly desirable in that removal of residual monomer from the polymer obtained is unnecessary.

Moreover polycaproamide can be prepared by the process of our invention having reduced viscosity, at 0.5% concentration in meta-cresol and at 25° C., of at least 5, corresponding to molecular weights considerably higher than those usually achieved by the conventional polymerization processes. Such high molecular weight materials possess greater tensile strength and toughness than those of lower molecular weight which have heretofore been prepared especially at elevated temperatures such as 210° C. This high temperature stability may be connected with high crystallinity of our polymers and/or with our pyrimidino end group terminating polyamide chains as above discussed in connection with Equation 3.

In addition, the polymerization of relatively fluid monomer to solid polymer in our process allows polymerizing ε-caprolactam directly in molds including molds of intricate design by our process, to form solid shaped articles, even articles of large size.

A further advantage is that various additives such as fillers and/or pigments and/or blowing agents and/or plasticizers and/or stabilizers, etc., man readily be incorporated in the polycaproamide product of our process. These materials can be homogeneously admixed with monomeric ε-caprolactam, which can then be converted to a polycaproamide. Such operations provide uniform distribution of the additive throughout the resulting polymer.

Still another advantage is that the polycaproamides of our invention contain pyrimidino end groups which can be devoid of primary amines as substituents. Such polycaproamides display considerable stability to oxidation as will be evident from the data hereinbelow.

The presence of a pyrimidino end group permits the inclusion of various substituents into said group which have significant effects upon the physical and/or chemical properties of the polyamide product. Thus, the presence of a chromophoric substituent will result in the formation of a colored polyamide in which the "dye" will be afforded by the pyridimino group and will consequently be part of the molecular structure, and hence non-extractable. The presence of long chain aliphatic groups as substituents in the pyrimidine nucleus will confer a degree of lubricity and compatibility with plasticizers, etc., on the polymer. Such lubricity is advantageous in the preparation of molded products, since the polyamide so molded will not tend to adhere to the surface of the mold. Moreover, the presence of such aliphatic groups will increase the hydrophobicity of the polyamide thus making it less susceptible to deformation and hydrolytic attack.

The best mode contemplated by us for carrying out our invention can be set forth as follows:

A metal salt of epsilon-caprolactam, e.g., the lithium salt, is prepared in situ as a colloidal solution containing about a 0.02–0.2% by weight of lithium in dry lactam and is brought to about 90°–100° C. A solution is separately prepared in dry caprolactam of the desired pyrimidine, e.g., 2,4-dichloro pyrimidine; 2,4-dimethoxy pyrimidine; or 2,4-diphenoxy pyrimidine; or 2,4,6-trichloro or trimethoxy or triphenoxy pyrimidine; or a monochloro diphenoxy pyrimidine; etc., at about 0.1–1% concentration by weight and is brought to about 190°–200° C.

The two solutions are metered, suitably at equal volumes, into an efficient mixing zone from which the mixture passes rapidly into the mold, heated to about 140°–180° C. All operations are in absence of air, e.g., under a pure, dry nitrogen atmosphere.

The polymer forms rapidly, setting in the mold to a solid. Desirably a supply of polymerization reaction mixture is provided in communication with the mold and under pressure, whereby the mold is kept filled during the polymerization and formation of voids is prevented. After the reaction mixture has solidified, it is cured or annealed under the reaction conditions, suitably for about an hour.

The following example describes completely specific embodiments of our invention and further illustrates our invention but the invention is not to be understood as limited to all details of the example.

EXAMPLE (A) ε-Caprolactam containing not over 50 p.p.m. water was prepared by distilling said caprolactam at 100–115° C. under 3–5 mm. Hg absolute pressure. The dry caprolactam thus obtained was admixed with lithium hydride under anhydrous conditions in proportions of 0.84 mol lithium hydride per 100 mols caprolactam. The resulting mixture was then heated to 160° C. over a period of 2 hours under a dry nitrogen blanket until evolution of hydrogen ceased, indicating completion of reaction and production of 0.84 mol of the lithium salt of caprolactam, per 100 mols of caprolactam (including that in the salt).

The resulting solution was constantly agitated at 160° C. with a mechanical stirrer and 2,4,6-trichloropyrimidine was added thereto in proportion of 0.08 mol per 100 mols of total caprolactam. Incipient polymerization of ε-caprolactam to a thick gel was visually observable within 5 minutes; a substantial formation of solid poly-ε-caprolactam was evident within 35 minutes.

After 3 hours of heating at 160° C., the solid mass was cooled slowly to ambient temperature (ca. 25° C.), and then ground to 20 mesh particle size. The solid material thus obtained was extracted for 3 hours with 50 volumes of boiling water and then dried at 55° C. under 1 mm. Hg absolute pressure for an additional 24 hours. The poly-ε-caproamide thereby obtained melted at about 225° C. and was insoluble in 0.5% m-cresol solution at 25° C. The monomer conversion was 96.9%.

The presence of a pyrimidine nucleus in the polyamide thus produced was confirmed by examination of the ultraviolet spectrum of said polyamide. A dilute solution of the polyamide in concentrated sulfuric acid at 25° C. exhibited a maximum absorption band at 240 millimicrons, substantially the same region at which pyrimidine nuclei are known to undergo absorption (J. Chem. Phys., 19, 711 (1951)). Examination of a poly-ε-caproamide prepared by conventional anionic polymerization technique using LiH as the sole catalytic agent revealed no ultraviolet absorption bands in this region.

(B) Using the above described procedure except that 2,4,6-triphenoxypyrimidine and 2,4,6-trimethoxypyrimidine respectively are substituted for the above 2,4,6-trichloropyrimidine, solid poly-ε-caproamide possessing at least one pyrimidine end group is obtained.

(C) In order to demonstrate the remarkable oxidative stability of the polymers of the present invention, a polymer sample prepared as described in the example, part (A), was heated in an air circulating oven at 165° C. for 6 hours. For purposes of comparison, samples of poly-ε-caproamide prepared by conventional hydrolytic polymerization, and by anionic polymerization employing lithium hydride as the sole catalytic agent were treated in the same manner. All the samples were originally white or light yellow in color. A comparison of the amount of discoloration obtained is shown in Table I wherein the change of color is expressed in terms of the Gardner color standard.

Table I

| Polymer Sample | Discoloration (increase in Gardner color index) |
|---|---|
| Example (A) | 1 |
| Hydrolytic Preparation | 6 |
| LiH Anionic Preparation | 12 |

It is evident from the above table that considerable discoloration to a dark brown material resulted with the samples prepared by either hydrolytic or lithium hydride anionic polymerization, whereas the polymer samples produced by our process were affected only slightly, or not at all.

It is known that the pyrazines (i.e., the 1,4-diazines) are similar to the pyrimidines in chemical properties. Accordingly, our invention includes use of pyrazines having replaceable substituents, such as 2-chloropyrazine, tetrachloropyrazine and bromopyrazine, in the same manner as the pyrimidines above discussed and illustrated.

While the above describes the preferred embodiments of our invention, it must be understood that departures therefrom are within the scope of the specification and claims.

We claim:

1. In a process for the polymerization of a lactam under anionic polymerization conditions involving base-catalyzed anhydrous conditions wherein a lactam salt of a metal of the group consisting of alkali metals and alkaline earth metals is a catalyst, the improvement which comprises providing in the reaction mixture as promoter at least one diazine of the group consisting of pyrimidines and pyrazines which bears on at least one of the ring carbon atoms adjoining a ring nitrogen atom, a substituent attached to said carbon atom by a more electronegative atom than the nitrogen atom of the lactam; maintaining in the reaction mixture a temperature from the melting point of the lactam monomer to the decomposition temperature of the resulting polymer and providing the lactam salt and said diazine in ratio at least 1.1:1 of equivalents of metal forming the lactam salt:equivalents of the aforesaid substituents in the diazine supplied.

2. Improvement of claim 1, wherein the lactam polymerized is at least one member of the group consisting of 2-pyrrolidone, 2-piperidone, ε-caprolactam, enanthic lactam, omega-caprylic lactam.

3. Improvement of claim 1, wherein the lactam polymerized is ε-caprolactam and the promoter comprises 2,4,6-tri(2-caproimido) pyrimidine.

4. A process for the polymerization of a lactam of the group consisting of 2-pyrrolidone, 2-piperidone, ε-caprolactam, enanthic lactam, omega-caprylic lactam, which comprises forming a reaction mixture of said lactam with a metal salt of said lactam and with a pyrimidine which bears on at least one of the ring positions 2, 4, and 6 a substituent replaceable by metathesis with said lactam salt, and maintaining said reaction mixture in the liquid state at temperatures not above the softening point of the polyamide product which results, until solid polymer is formed in said reaction mixture.

5. Process of claim 4, wherein the replaceable substituent in the pyrimidine is at least one member of the group consisting of halogen atoms and substituents attached to the pyrimidine ring by an oxygen atom.

6. Process of claim 5, wherein the lactam polymerized is ε-caprolactam, the metal salt is an alkali metal salt, the temperature of polymerization is in the range from about 140° C. to about 215° C., and the ratio of atomic proportions of alkali metal in the reaction mixture to equivalents of replaceable substituents in the quantity of pyrimidine supplied lies within the range from about 2:1 to about 10:1.

7. Process of claim 6 wherein the alkali metal is lithium and the pyrimidine is 2,4,6-trichloropyrimidine, and polymerization takes place in a mold.

8. Process of claim 6 wherein the alkali metal is lithium and the pyrimidine is 2,4,6-triphenoxypyrimidine.

9. Process of claim 6 wherein the alkali metal is lithium and the pyrimidine is 2,4,6-trimethoxypyrimidine.

10. As a new composition of matter 2,4,6-tri(N-poly-ε-caproamido) pyrimidine of melting point about 225° C.

References Cited by the Examiner

UNITED STATES PATENTS

| 3,017,391 | 1/1962 | Mottus et al. | 260—78 |
| 3,017,392 | 1/1962 | Butler et al. | 260—78 |
| 3,031,443 | 4/1962 | Ottenheym et al. | 260—239.3 |
| 3,045,008 | 7/1962 | Lombardino et al. | 260—239.3 |

FOREIGN PATENTS 1,229,130   3/1960   France.

WILLIAM H. SHORT, *Primary Examiner.*

JOSEPH R. LIBERMAN, *Examiner.*

H. D. ANDERSON, *Assistant Examiner.*